United States Patent
Kinomura

(10) Patent No.: US 11,966,862 B2
(45) Date of Patent: Apr. 23, 2024

(54) POWER SUPPLY FACILITY AND SERVER

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 17/851,663

(22) Filed: Jun. 28, 2022

(65) Prior Publication Data
US 2023/0061271 A1 Mar. 2, 2023

(30) Foreign Application Priority Data
Aug. 27, 2021 (JP) ................................ 2021-138783

(51) Int. Cl.
G06Q 10/02 (2012.01)
B60L 53/30 (2019.01)
F21S 8/08 (2006.01)

(52) U.S. Cl.
CPC ............. *G06Q 10/02* (2013.01); *B60L 53/30* (2019.02); *F21S 8/083* (2013.01)

(58) Field of Classification Search
CPC ..................................................... G06Q 10/02
See application file for complete search history.

(56) References Cited

U.S. PATENT DOCUMENTS

| 2012/0095812 | A1* | 4/2012 | Stefik | G08G 1/142 705/13 |
| 2013/0015707 | A1* | 1/2013 | Redmann | B60L 5/00 307/39 |
| 2013/0307477 | A1* | 11/2013 | Reinschke | B60L 53/30 320/109 |
| 2015/0130630 | A1* | 5/2015 | Outwater | G06Q 30/06 340/870.02 |
| 2020/0324661 | A1* | 10/2020 | Freeling-Wilkinson | B60L 53/18 |

FOREIGN PATENT DOCUMENTS

| JP | 2011-109807 A | 6/2011 |
| JP | 5475407 B2 | 2/2014 |

OTHER PUBLICATIONS

Siting Electric Vehicle Charging Stations, David Mayfield, Apr. 2012, Sustainable Transportation Strategies (Year: 2012).*

* cited by examiner

*Primary Examiner* — Emmett K. Walsh
*Assistant Examiner* — Ismail A Manejwala
(74) *Attorney, Agent, or Firm* — Sughrue Mion, PLLC

(57) ABSTRACT

A charging stand is a power supply facility that is able to be housed underground. The charging stand includes a light emitting device and a control device. The light emitting device is configured to emit light to a space above the ground. The control device is configured to control the light emitting device. A first light emission mode of the light emitting device for when the charging stand is available and a second light emission mode of the light emitting device for when the charging stand is not available are different.

8 Claims, 10 Drawing Sheets

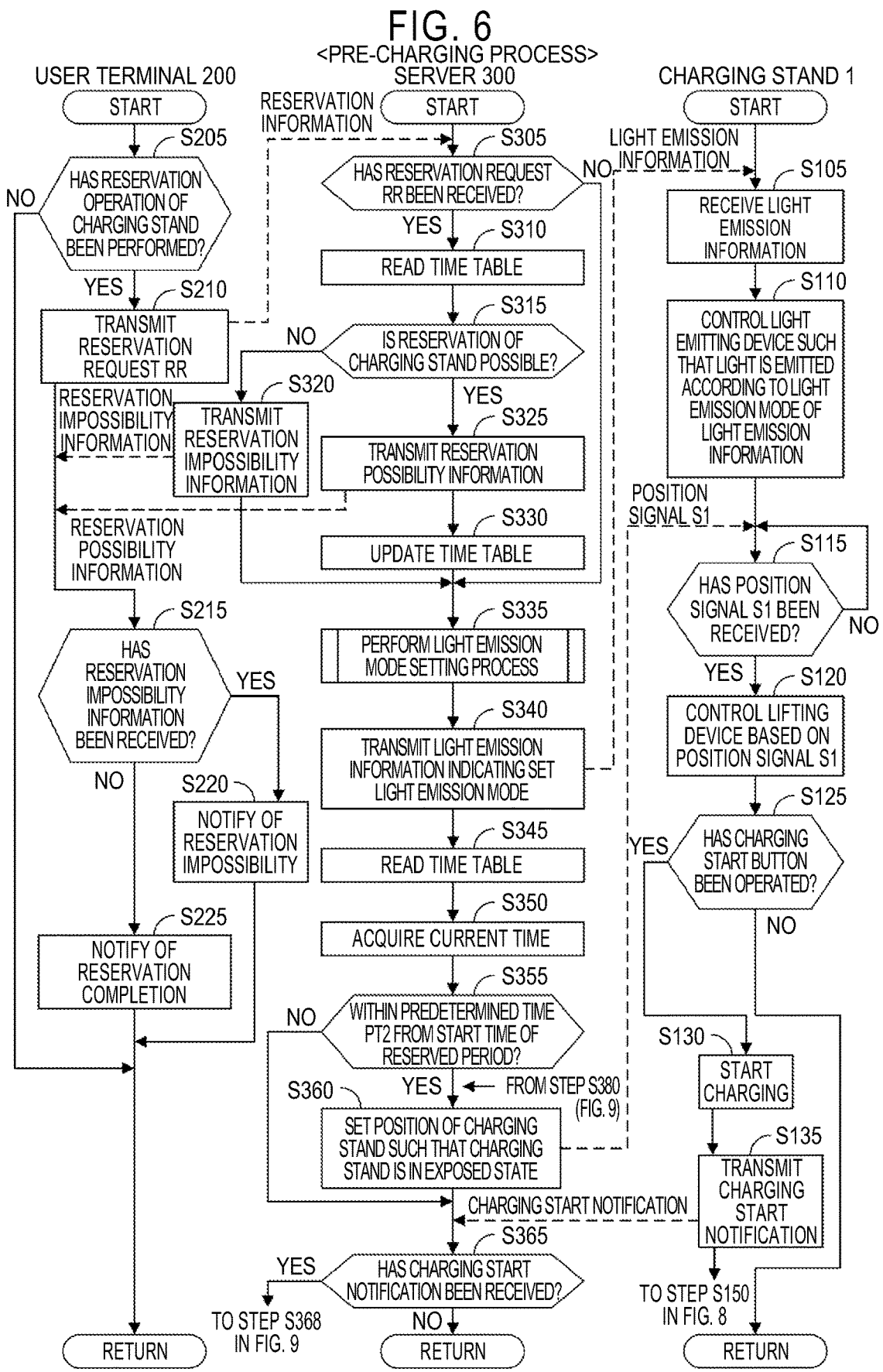

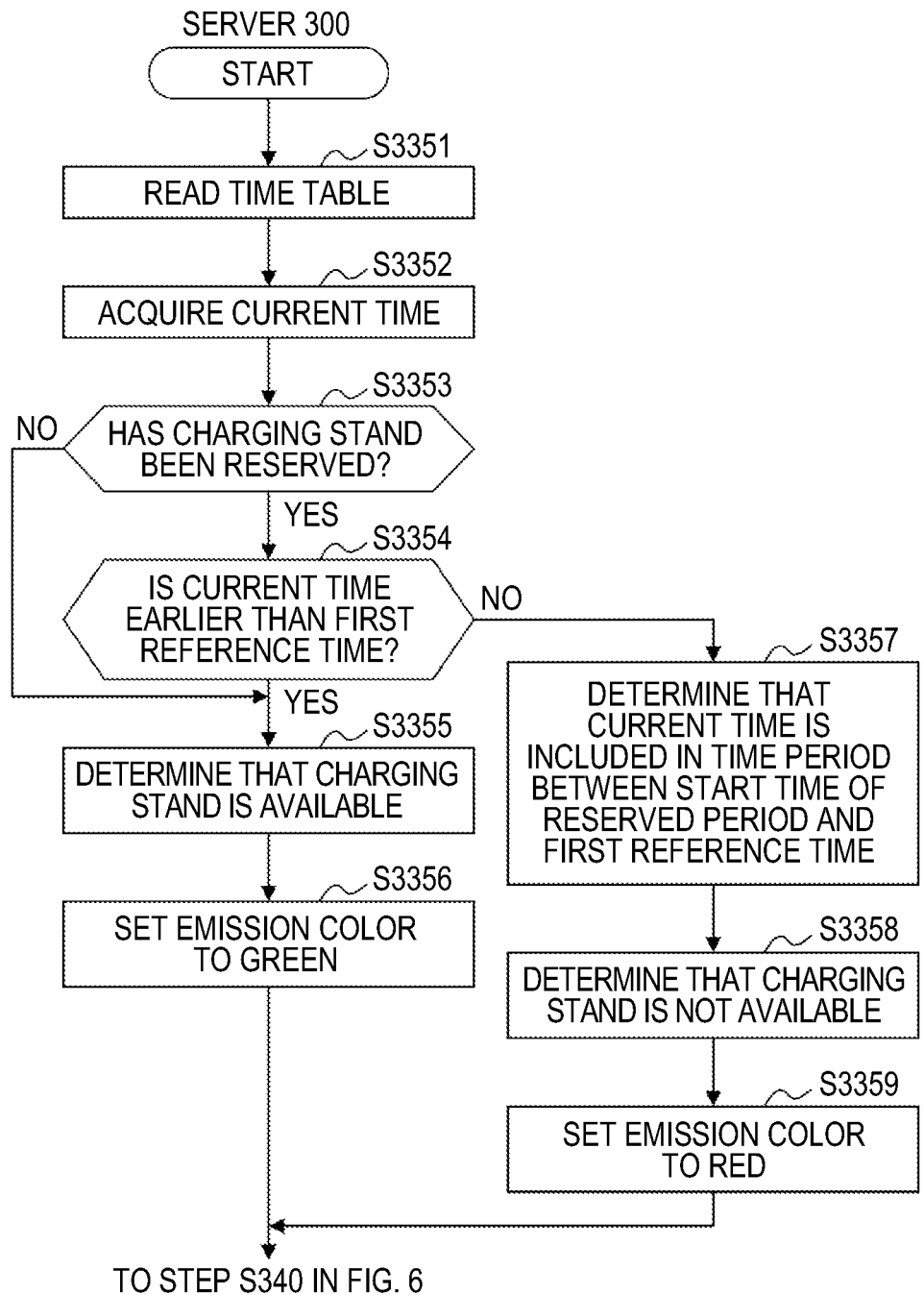

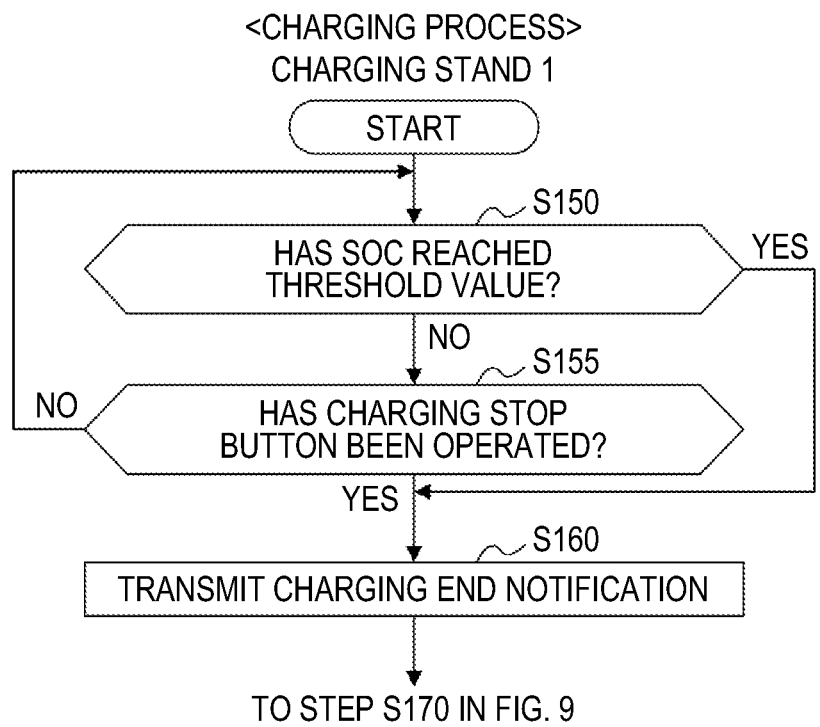

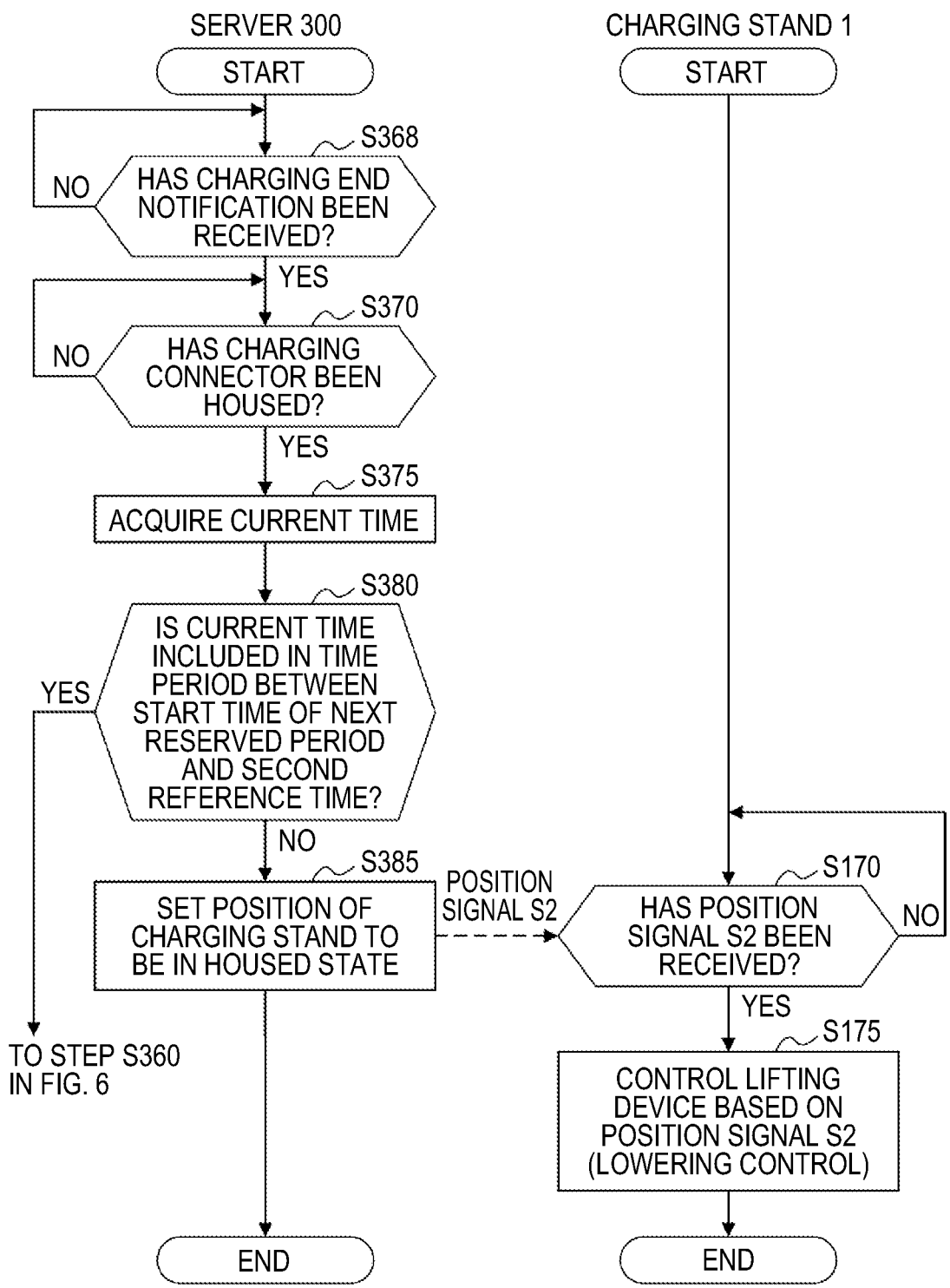

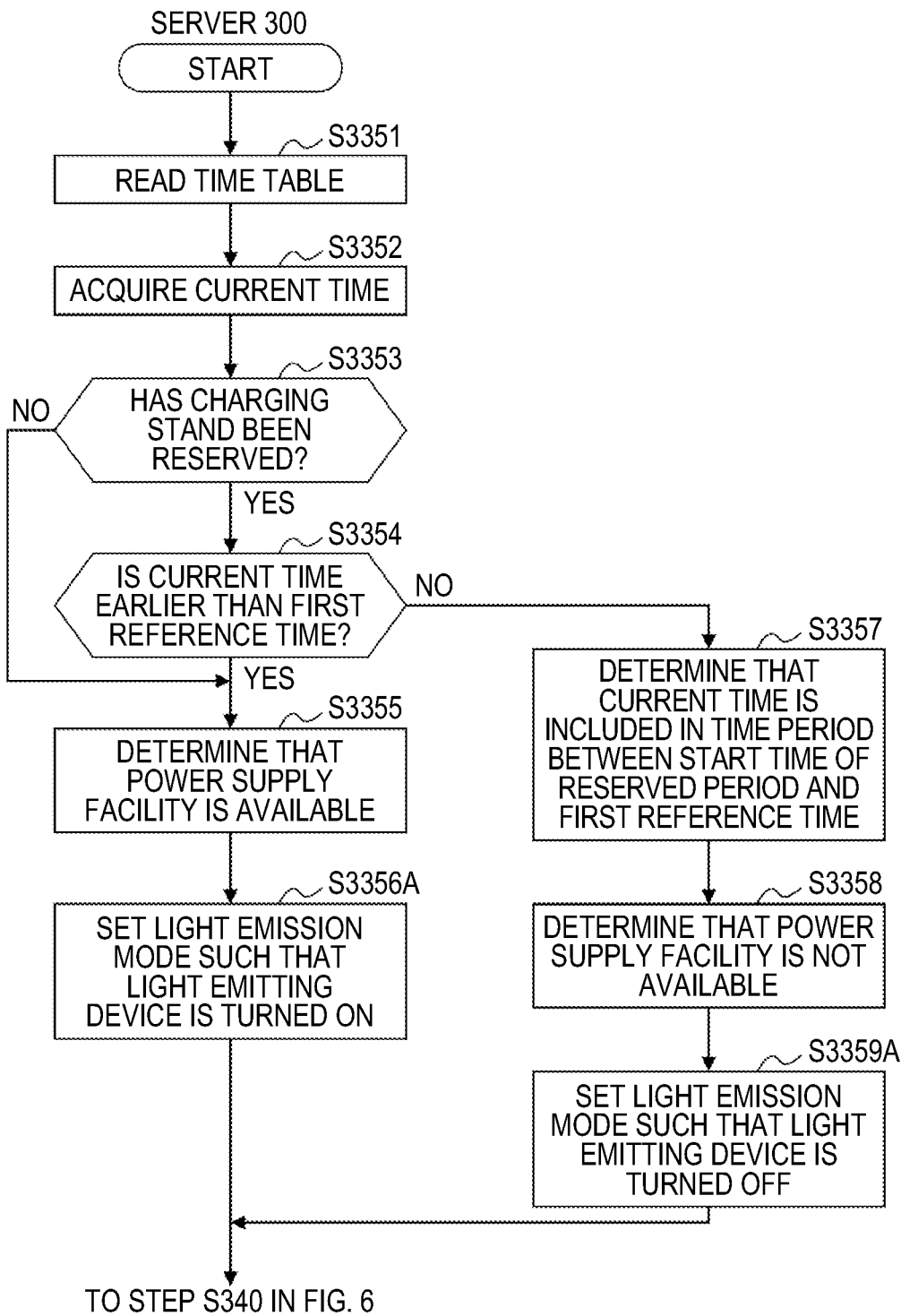

POWER SUPPLY FACILITY AND SERVER

CROSS-REFERENCE TO RELATED APPLICATION

This application claims priority to Japanese Patent Application No. 2021-138783 filed on Aug. 27, 2021, incorporated herein by reference in its entirety.

BACKGROUND

1. Technical Field

The present disclosure relates to a power supply facility and a server.

2. Description of Related Art

Japanese Unexamined Patent Application Publication No. 2011-109807 (JP 2011-109807 A) discloses a power supply facility that can be housed underground. This power supply facility includes a base pole (a fixed unit) and a charging pole (a movable unit). The charging pole is configured to be raised or lowered such that it rises up from the ground or is housed underground. A lamp is provided in the charging pole. When the charging pole rises up from the ground, the lamp is turned on. On the other hand, when the charging pole is housed underground, the lamp is turned off.

SUMMARY

For example, a user may not be able to use a reserved power supply facility when another user has reserved the power supply facility. Accordingly, there is demand for a technique for enabling a user to easily recognize whether a power supply facility is available.

The present disclosure provides a power supply facility and a server that enable a user to easily recognize whether a power supply facility which can be housed underground is available.

A power supply facility according to the present disclosure is a power supply facility that is able to be housed underground. The power supply facility includes a light emitting device and a control device. The light emitting device is configured to emit light to a space above the ground. The control device is configured to control the light emitting device. A first light emission mode of the light emitting device for when the power supply facility is available and a second light emission mode of the light emitting device for when the power supply facility is not available are different.

With this configuration, a user can visually recognize whether the power supply facility is available depending on whether the light emission mode of the light emitting device is the first light emission mode or the second emission mode. As a result, a user can easily recognize whether the power supply facility is available.

An emission color of the light emitting device in the first light emission mode may be a first color, and the emission color of the light emitting device in the second light emission mode may be a second color.

With this configuration, a user can visually recognize whether the power supply facility is available depending on the emission color. As a result, a user can easily recognize whether the power supply facility is available.

The light emitting device may be turned on in the first light emission mode, and the light emitting device may be turned off in the second light emission mode.

With this configuration, when the power supply facility is not available, the light emitting device is turned off and thus the light emitting device does not consume electric power. As a result, it is possible to reduce power consumption in the light emitting device and to enable a user to easily recognize whether the power supply facility is available.

The case in which the power supply facility is available may include a case in which the power supply facility is not reserved and a case in which the power supply facility is reserved and a current time is earlier than a reference time a predetermined time prior to a start time of a reserved period of the power supply facility. The case in which the power supply facility is not available may include a case in which the power supply facility is reserved and the current time is in a time period between the start time and the reference time.

A server according to the present disclosure includes a control device and a storage device. The control device is configured to control a light emitting device which is provided in a power supply facility that is able to be housed underground. The storage device is configured to store reservation state information indicating a reservation state of the power supply facility. The light emitting device is configured to emit light to a space above the ground. The control device is configured to determine whether the power supply facility is available based on the reservation state information and to set a light emission mode of the light emitting device based on the result of determination. A first light emission mode of the light emitting device for when the power supply facility is available and a second light emission mode of the light emitting device for when the power supply facility is not available are different.

According to the present disclosure, it is possible to enable a user to easily recognize whether a power supply facility which can be housed underground is available.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart illustrating details of a pre-charging process (Step S10 in FIG. 5);

FIG. 7 is a flowchart illustrating details of a light emission mode setting process (Step S335 in FIG. 6);

FIG. 8 is a flowchart illustrating details of a charging process (Step S20 in FIG. 5);

FIG. 9 is a flowchart illustrating details of a post-charging process (Step S30 in FIG. 5); and FIG. 10 is a flowchart illustrating details of a light emission mode setting process in a light emitting device according to a modified example.

DETAILED DESCRIPTION OF EMBODIMENTS

Figure 1:
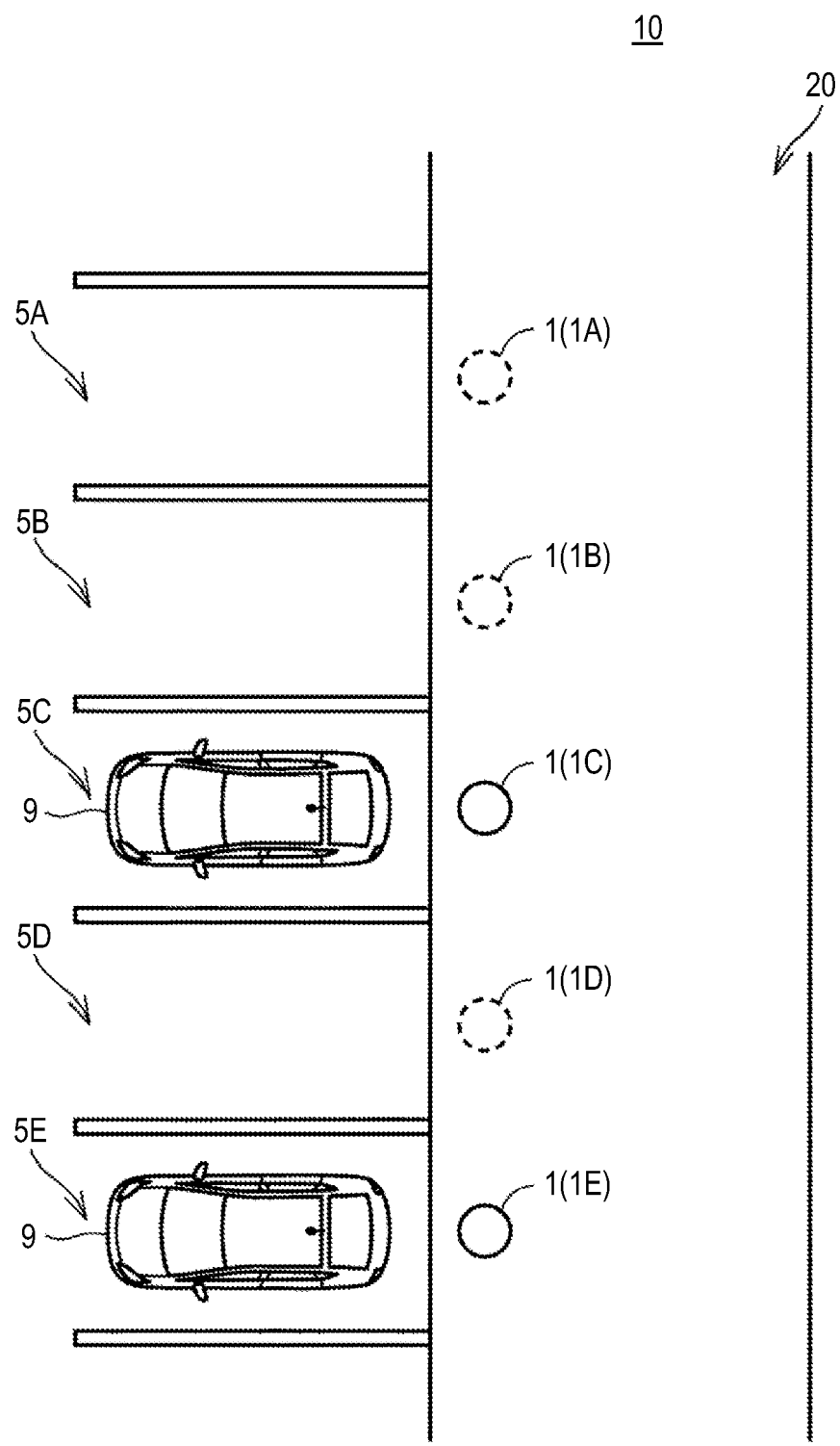
FIG. 1 is a diagram illustrating an example of a layout of a charging system for a vehicle according to an embodiment.

Hereinafter, an embodiment of the present disclosure will be described in detail with reference to the accompanying drawings. The same or corresponding elements in the drawings will be referred to by the same reference signs and description thereof will not be repeated.

Embodiment

FIG. 1 is a diagram illustrating an example of a layout of a charging system for a vehicle according to an embodiment. Referring to FIG. 1, vehicles 9 park in two parking spaces (parking spaces 5C and 5E in this example) among parking spaces 5A to 5E provided in a parking lot. The charging system 10 includes a plurality of vehicles 9 and a plurality of charging stands 1 (1A to 1E).

Each vehicle 9 is a battery electric vehicle (BEV). Each vehicle 9 may be a plug-in hybrid electric vehicle (PHEV) that can be subjected to plug-in charging.

The plurality of charging stands 1 is installed in a space (a walkway 20 in this example) near the parking spaces 5A to 5E. Each charging stand 1 is a power supply facility that can perform plug-in charging on a vehicle 9. The number of charging stands 1 installed is not particularly limited.

Each charging stand 1 is configured to switch between raised and lowered states. Specifically, each charging stand 1 is configured to switch between a "housed state" in which the charging stand is housed underground and an "exposed state" in which the charging stand is exposed from the ground (that is, rises up from the ground).

In this example, a charging stand 1 (1C and 1E) in the exposed state is illustrated by a solid line. On the other hand, a charging stand 1 (1A, 1B, and 1D) in the housed state is illustrated by a dotted line. Each charging stand 1 cannot be used for plug-in charging of a vehicle 9 when it is in the housed state. On the other hand, each charging stand 1 can be used for plug-in charging of a vehicle 9 when it is in the exposed state.

Figure 2:
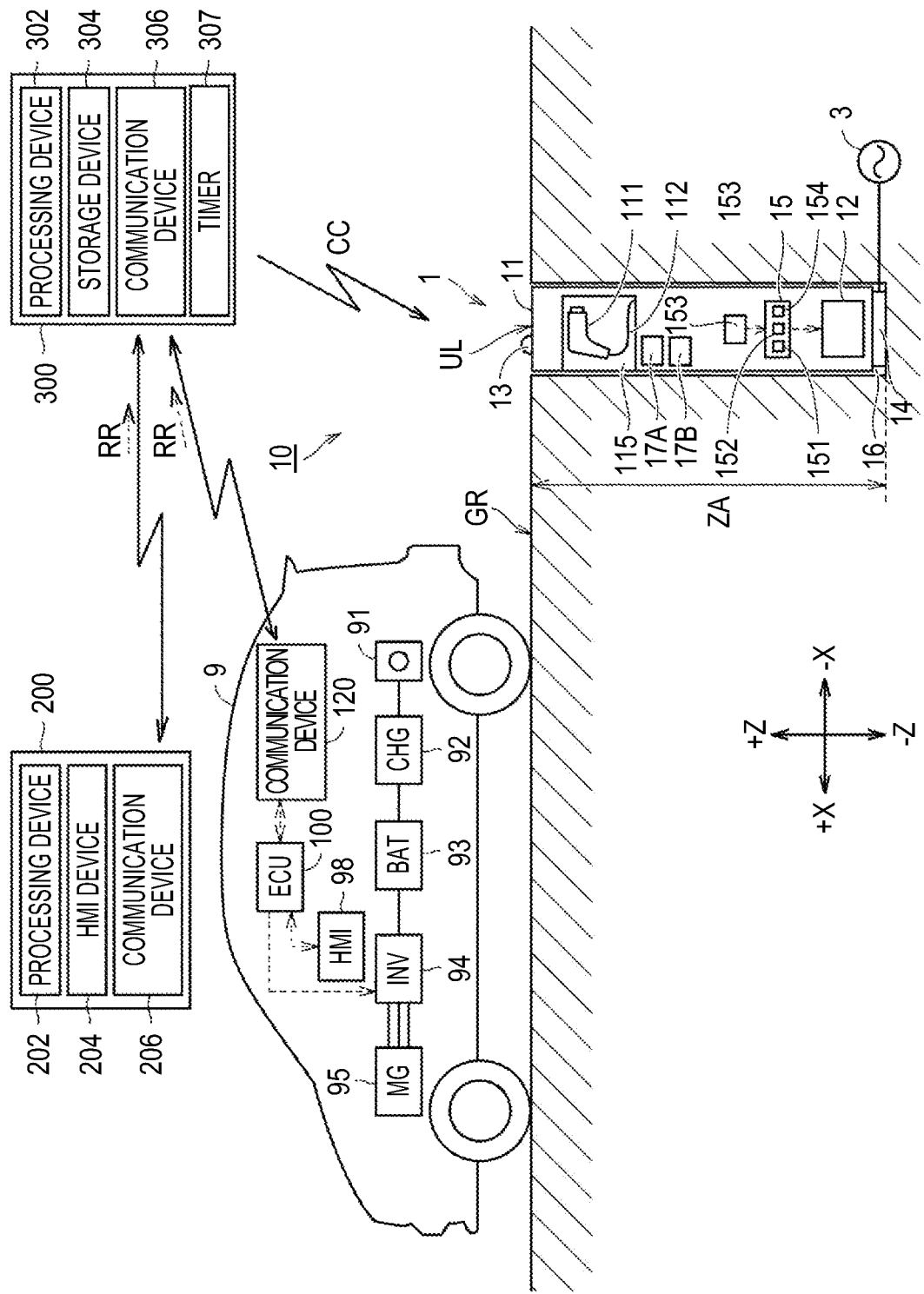
FIG. 2 is a diagram illustrating an example of configurations of a charging stand in a housed state, a vehicle, a user terminal, and a server.
Figure 3:
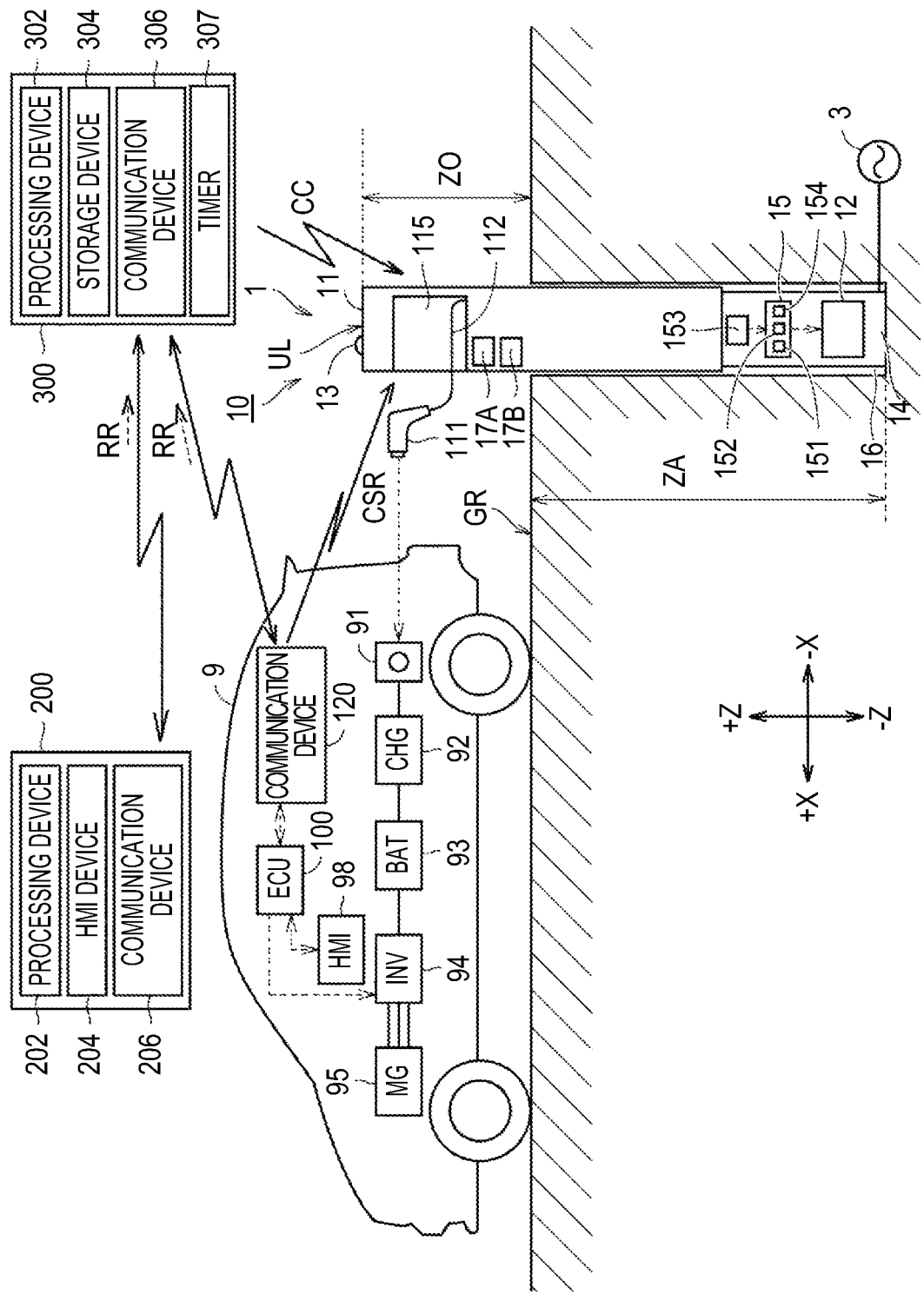
FIG. 3 is a diagram illustrating an example of configurations of a charging stand in an exposed state, a vehicle, a user terminal, and a server.

FIG. 2 is a diagram illustrating an example of configurations of a charging stand 1 in the housed state, a vehicle 9, a user terminal 200, and a server 300. FIG. 3 is a diagram illustrating an example of configurations of a charging stand 1 in the exposed state, a vehicle 9, a user terminal 200, and a server 300. The charging stand 1, the vehicle 9, and the user terminal 200 are configured to communicate with the server 300.

Referring to FIGS. 2 and 3, the housed state of the charging stand 1 is a state in which the charging stand 1 has been lowered until the height of an upper end UL in the +Z direction is substantially equal to the height of the ground GR (FIG. 2). The exposed state is a state in which the upper end UL in the +Z direction has been raised by a predetermined height Z0 from the ground GR (FIG. 3).

The charging stand 1 includes, for example, a cylindrical housing. The charging stand 1 is installed on the bottom of a recessed portion 16 formed in the ground GR. The recessed portion 16 is formed to have a predetermined gap from an outer circumferential surface of the housing of the charging stand 1. The depth of the recessed portion 16 is substantially equal to a length ZA in the +Z direction of the charging stand 1 in the housed state (FIG. 2).

The charging stand 1 is controlled by the server 300 based on an operation which has been performed by a user using a human-machine interface (HMI) device 204 of the user terminal 200 or an HMI device 98 of the vehicle 9 (both of which will be described later). The charging stand 1 is configured to be reserved by a user. The charging stand 1 can be used by another user (a second user) when it is not reserved by a user (a first user). On the other hand, the charging stand 1 may not be used by another user when it is reserved by a user.

The charging stand 1 includes a light emitting device 13, a movable unit 11, and a fixed unit 14. The light emitting device 13 is provided at an upper end UL of the movable unit 11. The light emitting device 13 is configured to emit light to a space above the ground GR. The light emitting device 13 is, for example, a light emitting diode (LED), a fluorescent lamp, or an organic electro-luminescence (OEL) device. The light emitting device 13 may be provided in an area near the movable unit 11 in the +X direction or the −X direction. Specifically, the nearby area is an area on the ground GR which is separated a predetermined distance from the movable unit 11 in the +X direction or the —X direction.

The movable unit 11 is configured to be raised or lowered by a lifting device 12 (which will be described later) which is provided in the fixed unit 14. The lifting direction of the movable unit 11 is the +Z direction or the −Z direction in this example. The lifting direction of the movable unit 11 may be inclined by a predetermined angle with respect to the directions. The movable unit 11 includes a charging connector 111, a charging cable 112, a charging start button 17A, and a charging stop button 17B.

The charging connector 111 is inserted into (connected to) an inlet 91 (which will be described later) of a vehicle 9. The charging connector 111 is electrically connected to one end of the charging cable 112. A power supply 3 is electrically connected to the other end of the charging cable 112. The power supply 3 is an alternating-current power supply such as a commercial power supply. A power converter (not illustrated) may be provided between the charging cable 112 and the power supply 3. A user can take the charging connector 111 out of a housing space 115 formed in the movable unit 11 and extend the charging cable 112 to the inlet 91 (FIG. 3).

The housing space 115 is configured to house the charging connector 111 and the charging cable 112. A sensor (not illustrated) is provided in the housing space 115. This sensor detects whether the charging connector 111 and the charging cable 112 are housed at a predetermined position in the housing space 115. A signal indicating a detection result from the sensor is output to the control device 15 and is transmitted to the server 300 after it has been received by the control device 15.

The charging start button 17A and the charging stop button 17B are operated (pressed) by a user in a situation in which the charging connector 111 is inserted into the inlet 91. When the charging start button 17A or the charging stop button 17B is operated, a signal indicating that the corresponding button has been operated is output to the control device 15. When the charging start button 17A is operated, the control device 15 starts plug-in charging of the vehicle 9. On the other hand, when the charging stop button 17B is operated while plug-in charging is being performed, the control device 15 stops (ends) plug-in charging.

The fixed unit 14 includes the lifting device 12, the communication device 153, and the control device 15. The lifting device 12 raises and lowers the movable unit 11 in the +Z direction or the −Z direction such that the state of the charging stand 1 is switched between the housed state and the exposed state. The lifting device 12 may employ various mechanisms. Specifically, the lifting device 12 may employ a rack-and-pinion type mechanism, a mechanism using a hydraulic cylinder, or a magnetic mechanism. The rack-and-pinion type mechanism rotates a pinion gear engaging with a rack gear fixed to the movable unit 11 using an electric actuator. The mechanism using a hydraulic cylinder increases or decreases a hydraulic pressure supplied to a cylinder body when a rod connected to a piston is fixed to the movable unit 11. The magnetic mechanism generates a magnetic repulsive force between the movable unit 11 and the lifting device 12.

The lifting device 12 preferably includes a mechanism (such as a stopper) for limiting excessive movement of the movable unit 11 in the +Z direction or the −Z direction. Accordingly, the lifting device 12 is configured such that the movable unit 11 is not lowered below a position corresponding to the housed state (that is, a position at which the upper end UL of the movable unit 11 is substantially flush with the ground GR). The lifting device 12 is configured such that the movable unit 11 is not raised above a position corresponding to the exposed state (that is, a position at which the upper end UL is higher a predetermined height Z0 than the ground GR).

The communication device 153 communicates with an external device of the charging stand 1 (for example, the server 300 and a vehicle 9) in a wired or wireless manner. For example, the communication device 153 receives a control command CC from the server 300. The control command CC is used for the control device 15 to control the charging stand 1. The communication device 153 is configured to receive a charging stop request CSR (FIG. 3) from a vehicle 9.

The control device 15 includes a processor 151, a memory 152, and a timer 154. The processor 151 is, for example, a central processing unit (CPU). The memory 152 includes a read only memory (ROM) and a random access memory (RAM) (none of which are illustrated).

The control device 15 controls constituents of the charging stand 1 in accordance with information stored in the memory 152 and the control command CC housed from the server 300 via the communication device 153. For example, the control device 15 controls the light emitting device 13 such that the light emitting device 13 emits light.

The control device 15 performs raising control and lowering control by controlling the lifting device 12. Raising control is control for causing the lifting device 12 to raise the movable unit 11 in the +Z direction. Lowering control is control for causing the lifting device 12 to lower the movable unit 11 in the −Z direction. When raising control is performed in a situation in which the charging stand 1 is in the housed state, the charging stand 1 is changed to the exposed state.

In the exposed state, the charging stand 1 may serve as an obstacle for a pedestrian on a walkway 20 (FIG. 1). Accordingly, a time period in which the charging stand 1 is in the exposed state is preferably as short as possible in a range in which plug-in charging using the charging stand 1 is possible.

Therefore, raising control is performed such that the charging stand 1 is switched from the housed state to the exposed state immediately (for example, in a predetermined time) before a reserved period of the charging stand 1. Lowering control is performed when the charging connector 111 and the charging cable 112 are received in the housing space 115 in a situation in which plug-in charging of the vehicle 9 has ended. Accordingly, the charging stand 1 is switched from the exposed state to the housed state.

The vehicle 9 includes an inlet 91, a charging device 92, a battery 93, an inverter 94, a motor generator 95, an HMI device 98, a communication device 120, and an ECU 100.

The inlet 91 is configured such that the charging connector 111 of the charging stand 1 can be inserted thereinto. When the charging connector 111 is inserted into the inlet 91, the inlet 91 and the charging connector 111 are electrically connected. Accordingly, electric power can be transmitted from the charging stand 1 to the vehicle 9.

When AC electric power is supplied from the charging stand 1 to the inlet 91, the charging device 92 converts the AC electric power to DC electric power and supplies the DC electric power to the battery 93.

The battery 93 is a secondary battery such as a nickel-hydride battery or a lithium-ion battery. A current sensor, a voltage sensor, and a temperature sensor (none of which are illustrated) are provided in the battery 93. The current sensor, the voltage sensor, and the temperature sensor detect a current, a voltage, and a temperature of the battery 93. Detection values from the sensors are output to the ECU 100.

The inverter 94 converts DC electric power stored in the battery 93 to AC electric power and supplies the AC electric power to the motor generator 95.

The motor generator 95 drives the vehicle 9 by applying a rotational force to driving wheels using electric power from the inverter 94. Accordingly, the vehicle 9 travels.

The HMI device 98 includes an input device and a display device (none of which are illustrated). The input device receives a user operation (a reservation operation) for reserving the charging stand 1. The display device displays various screens (including a screen for notifying a user whether reservation of the charging stand 1 is possible).

The communication device 120 is configured to communicate with the server 300. For example, when the user operation is performed, the communication device 120 transmits a reservation request RR to the server 300. The reservation request RR includes information indicating a charging stand 1 to be reserved (one of the charging stands 1A to 1E in the example illustrated in FIG. 1) and a reserved period of the charging stand 1. The communication device 120 is configured to communicate with the charging stand 1 and transmits, for example, a charging stop request CSR (FIG. 3) to the charging stand 1.

The ECU 100 includes a memory and a CPU (none of which are illustrated). The memory stores a program which is executed by the CPU. The CPU performs various operations in accordance with the program stored in the memory. Accordingly, the ECU 100 can control constituents of the vehicle 9.

For example, the ECU 100 controls the communication device 120 such that a reservation request RR is transmitted from the vehicle 9 to the server 300. When a state of charge (SOC) of the battery 93 reaches a predetermined charging threshold value while plug-in charging of the vehicle 9 is being performed, the ECU 100 transmits the charging stop request CSR to the charging stand 1 via the communication device 120. Accordingly, plug-in charging ends. The ECU 100 can calculate the SOC of the battery 93 using a known technique based on detection values from the current sensor, the voltage sensor, and the temperature sensor.

The user terminal 200 includes an HMI device 204, a communication device 206, and a processing device 202. The HMI device 204 has the same configuration and function as the HMI device 98. Specifically, the HMI device 204 includes an input device and a display device (none of which are illustrated) and receives a user operation (a reservation operation) for a reservation request RR. A signal indicating that the reservation operation has been performed is transmitted from the HMI device 204 to the processing device 202. The communication device 206 is configured to communicate with the server 300.

The processing device 202 includes a CPU and a memory (none of which are illustrated). The processing device 202 controls the HMI device 204 and the communication device 206. For example, when a user operation for a reservation request RR is performed on the HMI device 204, the processing device 202 controls the communication device 206 such that the reservation request RR is transmitted from the user terminal 200 to the server 300. In this way, the reservation request RR may be transmitted from one of the communication device 120 of the vehicle 9 and the communication device 206 of the user terminal 200 to the server 300.

The server 300 is configured to manage and control a plurality of charging stands 1. The server 300 includes a storage device 304, a communication device 306, a timer 307, and a processing device 302.

The storage device 304 stores a time table indicating various states of the charging stands 1 (including a reservation state of each charging stand 1). Reservation state information indicating the reservation state is used to determine whether the corresponding charging stand 1 is available. Details of the time table will be described later in detail.

The communication device 306 is configured to communicate with the vehicle 9, the user terminal 200, and the charging stand 1.

The processing device (control device) 302 generates a control command CC for controlling the charging stand 1 (specifically, the light emitting device 13, the lifting device 12, and the like). The processing device 302 transmits a control command CC to the charging stand 1 via the communication device 306.

For example, a user may not use a reserved charging stand 1 when another user has reserved the charging stand 1. Accordingly, there is demand for techniques for allowing a user to easily recognize whether a charging stand 1 is available. Particularly, when the charging stand 1 is in the housed state (FIG. 2), a user has difficulty recognizing the charging stand 1. Accordingly, a user has difficulty recognizing whether the charging stand 1 is available.

Therefore, according to this embodiment, the processing device 302 of the server 300 sets first and second light emission modes such that a light emission mode (the first light emission mode) of the light emitting device 13 when the charging stand 1 is available and a light emission mode (the second light emission mode) of the light emitting device 13 when the charging stand 1 is not available are different. For example, the processing device 302 sets the first and second light emission modes such that an emission color of the light emitting device 13 in the first light emission mode is green (a first color) and the emission color of the light emitting device 13 in the second light emission mode is red (a second color).

With this configuration, a user can visually recognize whether the charging stand 1 is available based on whether the light emission mode of the light emitting device 13 is the first light emission mode or the second light emission mode (for example, based on whether the emission color is red or green). As a result, a user can easily recognize whether the charging stand 1 is available in comparison with a case in which it is recognized by audio notification. Particularly, even in a situation in which the charging stand 1 is in the housed state (FIG. 2), the light emitting device 13 emits light to a space above the ground GR in the first or second light emission mode. Accordingly, a user can easily recognize whether the charging stand 1 is available.

The case in which the charging stand 1 is available is, for example, a case in which the charging stand 1 is not reserved. The case in which the charging stand 1 is available includes a case in which the charging stand 1 is reserved and a current time is earlier than a first reference time a first predetermined time prior to a start time of the reserved period of the charging stand 1 (for example, a time 30 minutes prior to the start time). In this case, the start time of the reserved period does not come soon. Accordingly, a user other than the user having reserved the charging stand is permitted to use the charging stand 1.

The case in which the charging stand 1 is not available is a case in which the charging stand 1 is reserved and the current time is in a time period between the start time and the reference time. In this case, the start time of the reserved period comes soon. Accordingly, a user other than the user having reserved the charging stand is not permitted to use the charging stand 1. The light emission modes of the light emitting device 13 will be described below in more detail.

Figure 4:
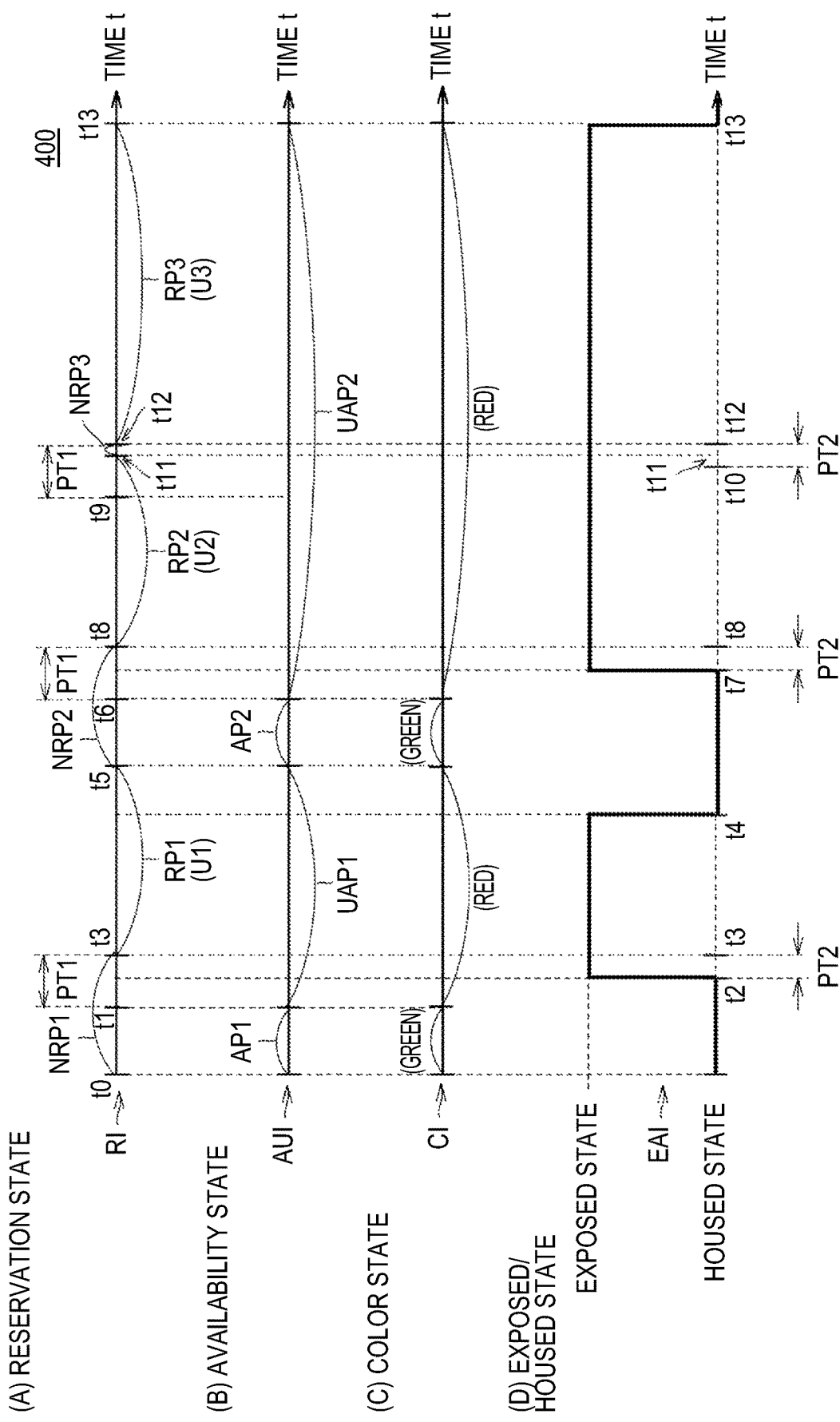
FIG. 4 is a diagram illustrating details of a time table stored in a storage device of the server.

FIG. 4 is a diagram illustrating details of the time table 400 stored in the storage device 304 of the server 300.

Referring to FIG. 4, the time table 400 represents temporal changes of a reservation state, an availability state, a color state of the emission color of the light emitting device 13, and the exposed/housed state for a representative charging stand 1 (for example, the charging stand 1A in FIG. 1).

Specifically, the time table 400 includes reservation state information RI, availability state information AUI, color state information CI, and exposed/housed state information EAI.

The reservation state information RI indicates a temporal change of the reservation state of the charging stand 1 ((A) of FIG. 4). Reserved periods RP1, RP2, and RP3 are periods which have been reserved by users U1, U2, and U3 having performed an operation of a reservation request RR. Non-reserved periods NRP1, NRP2, and NRP3 are periods different from the reserved periods RP1, RP2, and RP3.

The reservation state information RI is used to determine whether the charging stand 1 is available by a user other than the user having performed the reservation operation for a nearest reserved period. The nearest reserved period is a reserved period which is temporally closest to the current time out of at least one reserved periods after the current time. In the example illustrated in FIG. 4, when the current time is assumed to be time t0, the nearest reserved period is the reserved period RP1 out of the reserved periods RP1 to RP3.

The availability state information AUI indicates a temporal change of the availability state of the charging stand 1 ((B) of FIG. 4). The availability state information AUI is generated (determined) by the processing device 302 based on the reservation state information RI. Specifically, the charging stand 1 is not available in a period from a time (a first reference time) a predetermined time PT1 prior to a start time of a reserved period to an end time of the reserved period. For example, the charging stand 1 is not available in an unavailable period UAP1 from time t1 to time t5. In other words, a user other than the user U1 is not permitted to use the charging stand 1 in this period. Similarly, the charging stand 1 is not available in an unavailable period UAP2.

In a period (for example, an available period AP1 and an available period AP2) other than the unavailable period UAP1 and the unavailable period UAP2, the charging stand 1 is available. In this period, a user other than the user having performed the reservation operation is permitted to use the charging stand 1.

The color state information CI indicates a temporal change of the emission color of the light emitting device 13 of the charging stand 1 ((C) of FIG. 4). The color state information CI is generated by the processing device 302 based on the availability state information AUI. In this example, the emission color of the light emitting device 13 in an available period is green. On the other hand, the emission color of the light emitting device 13 in an unavailable period is red.

The exposed/housed state information EAI indicates a temporal change of the exposed/housed state of the charging stand 1 (more specifically, the raised/lowered state of the movable unit 11) ((D) of FIG. 4). The exposed/housed state information EAI is generated by the processing device 302 based on the reservation state information RI. Specifically, the charging stand 1 is in the exposed state in a period from a time (a second reference time) a predetermined time PT2 prior to a start time of a reserved period to a time at which the charging connector 111 and the charging cable 112 are returned (housed) in the housing space 115 after the reserved period has expired. In the other periods, the charging stand 1 is in the housed state.

The temporal changes of the reservation state, the availability state, the color state, and the exposed/housed state will be more specifically described below.

At time t0, the charging stand 1 is in the housed state. In a period from time t0 to time t1, time t is earlier than a time (the first reference time) t1 the predetermined time PT1 (for example, 30 minutes) prior to time t3 which is the start time of the reserved period RP1. Accordingly, in this period, the charging stand 1 is available (the available period AP1). As a result, the emission color of the light emitting device 13 is green.

In the period from time t1 (the first reference time) to time t3 (the start time of the reserved period RP1), the charging stand 1 is not available (the unavailable period UAP1). Accordingly, the emission color of the light emitting device 13 is red.

At time t2 (the second reference time), the lifting device 12 of the fixed unit 14 performs raising control such that plug-in charging is possible in the reserved period RP1. Accordingly, the charging stand 1 is switched from the housed state to the exposed state. Time t2 is a time (that is, a time immediately before the start time) the predetermined time PT2 (for example, 1 minute) prior to time t3 (the start time of the reserved period RP1). When the raising control is performed in this way, it is possible to make a time period in which the charging stand 1 is in the exposed state as short as possible.

A period from time t3 to time t5 is the reserved period RP1. In this example, at time t3, a user takes out the charging cable 112 from the housing space 115, inserts the charging connector 111 to the inlet 91, and operates the charging start button 17A. Accordingly, plug-in charging of the vehicle 9 is started.

At time t4, when the SOC of the battery 93 reaches a charging threshold value, the ECU 100 outputs a charging stop request CSR to the charging stand 1 via the communication device 120. Accordingly, plug-in charging using the charging stand 1 ends. The plug-in charging may end when the charging stop button 17B is operated. After the plug-in charging has ended, the user receives the charging connector 111 and the charging cable 112 in a predetermined position in the housing space 115. When the charging connector 111 and the charging cable 112 are housed in the housing space 115, the control device 15 performs lowering control. Specifically, the control device 15 controls the lifting device 12 such that the movable unit 11 is lowered in the −Z direction. Accordingly, the charging stand 1 is switched from the exposed state to the housed state.

In a period from time t5 to time t6, time t is earlier than time t6 (the first reference time) the predetermined time PT1 prior to time t8 which is the start time of the reserved period RP2. Accordingly, the charging stand 1 is available in this period (the available period AP2). The emission color of the light emitting device 13 is green.

In a period from time t6 to time t11, similarly to the period from time t1 to time t5, the charging stand 1 is not available (the unavailable period UAP2). Accordingly, the emission color of the light emitting device 13 is red.

At time t7, time t is a time (a time immediately before the start time) the predetermined time PT2 prior to time t8 (the start time of the reserved period RP2). Accordingly, similarly to time t2, the charging stand 1 is switched from the housed state to the exposed state.

The period from time t8 to time t11 is the reserved period RP2. In this example, plug-in charging of the vehicle 9 is started at time t8, and the plug-in charging is ended at time t11.

Time t11 is an end time of the reserved period RP2 and is in a time period between time t9 (the first reference time) the predetermined time PT1 prior to time t12 which is the start time of the next reserved period RP3 and time t12. In other words, time t12 which is the start time of the reserved period RP3 comes soon. Accordingly, a user other than the user U3 is not permitted to use the charging stand 1. Accordingly, in a period from time t11 to time t13 which is the end time of the reserved period RP3, the emission color of the light emitting device 13 is kept red.

Time t11 is also in a time period between time t10 (that is, the second reference time immediately before the start time of the reserved period RP3) the predetermined time PT2 (for example, 1 minute) prior to time t12 and time t12. Accordingly, lowering control is not performed at time t11 such that plug-in charging is possible in the next reserved period RP3. Accordingly, the charging stand 1 is kept in the exposed state.

Figure 5:
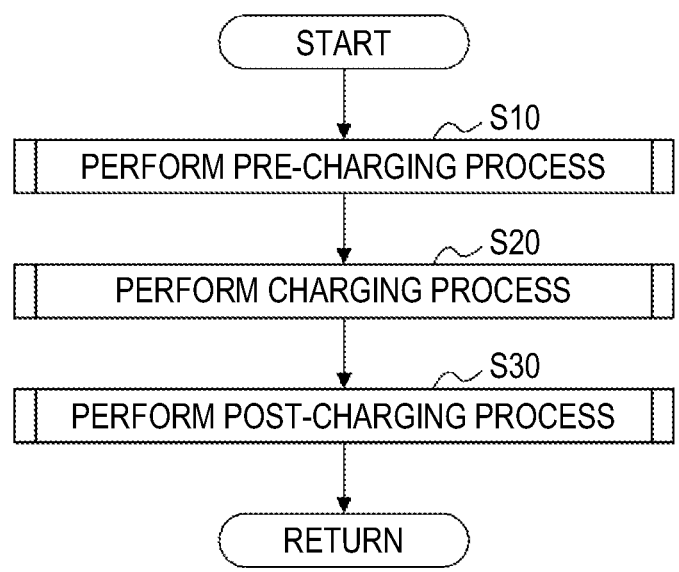
FIG. 5 is a flowchart schematically illustrating processes associated with plug-in charging of a vehicle using a charging stand.

FIG. 5 is a flowchart schematically illustrating processes associated with plug-in charging of a vehicle 9 using a charging stand 1. The processes in this flowchart are performed at intervals of a predetermined time when the user terminal 200, the server 300, and the charging stand 1 are operating.

Referring to FIG. 5, the processes associated with plug-in charging are roughly classified into three processes. First, a pre-charging process is performed before the plug-in charging (Step S10). Subsequently, a charging process is performed in the plug-in charging (Step S20). Then, a post-charging process is performed after the plug-in charging has ended (Step S30). These processes will be described below in detail.

FIG. 6 is a flowchart illustrating an example of details of the pre-charging process (Step S10 in FIG. 5). When the process of the flowchart is started, the charging stand 1 is in the housed state in which the charging stand 1 is housed under the ground GR. The following description will be made with appropriate reference to FIGS. 2 to 4.

Referring to FIG. 6, the processing device 202 of the user terminal 200 determines whether a reservation operation for the charging stand 1 has been performed (Step S205). Specifically, the processing device 202 determines whether a signal indicating that a user operation for a reservation request RR has been performed has been received from the HMI device 204.

When a reservation operation for the charging stand 1 has not been performed (NO in Step S205), the processing device 202 returns the process flow. On the other hand, when a reservation operation for the charging stand 1 has been performed (YES in Step S205), the processing device 202 transmits a reservation request RR to the server 300 via the communication device 206 (Step S210). Thereafter, the processing device 202 causes the process flow to proceed to Step S215.

In Step S305, the processing device 302 of the server 300 determines whether a reservation request RR has been received via the communication device 306. When a reservation request RR has not been received (NO in Step S305), the processing device 302 causes the process flow to proceed to Step S335. On the other hand, when a reservation request RR has been received (YES in Step S305), the processing device 302 causes the process flow to proceed to Step S310.

Subsequently, the processing device 302 reads the time table 400 from the storage device 304 (Step S310). Then, the processing device 302 determines whether a reservation of the charging stand 1 is possible based on the time table 400 (Step S315). Specifically, the processing device 302 determines whether a reserved period indicated by the reservation request RR (a newly requested reserved period) and a reserved period previously registered in the time table 400 overlap.

When a reservation of the charging stand 1 is not possible (NO in Step S315), that is, when the newly requested reserved period and the previously registered reserved period overlap, the processing device 302 transmits reservation impossibility information to the user terminal 200 via the communication device 306 (Step S320). The reservation impossibility information is information indicating that a reservation of the charging stand 1 is not possible. After Step S320, the process flow proceeds to Step S335.

On the other hand, when a reservation of the charging stand 1 is possible (YES in Step S315), that is, when the newly requested reserved period and the previously registered reserved period do not overlap, the processing device 302 transmits reservation possibility information to the user terminal 200 via the communication device 306 (Step S325). The reservation possibility information is information indicating that a reservation of the charging stand 1 is possible. After Step S325, the processing device 302 updates the time table 400 such that the newly requested reserved time is registered in the time table 400 (Step S330). Specifically, the processing device 302 updates the reservation state information RI, the availability state information AUI, the color state information CI, and the exposed/housed state information EAI. After Step S330, the process flow proceeds to Step S335.

In Step S215, the processing device 202 of the user terminal 200 determines whether reservation impossibility information has been received via the communication device 206. When reservation impossibility information has been received (YES in Step S215), the processing device 202 notifies a user that a reservation of the charging stand 1 is not possible (Step S220). Specifically, the processing device 202 displays a screen (not illustrated) indicating that a reservation is not possible on the display device of the HMI device 204. On the other hand, when reservation impossibility information has not been received, that is, when reservation possibility information has been received (NO in Step S215), the processing device 202 notifies a user that a reservation of the charging stand 1 is possible (Step S225). Specifically, the processing device 202 displays a screen (not illustrated) indicating that a reservation is possible on the display device of the HMI device 204.

In Step S335, the processing device 302 performs a process of setting a light emission mode of the light emitting device 13. Details of this process will be described later with reference to FIG. 7.

Subsequently, the processing device 302 transmits light emission information indicating the set light emission mode to the charging stand 1 via the communication device 306 (Step S340). The light emission information is transmitted as a part of the control command CC to the charging stand 1.

In Step S105, the control device 15 of the charging stand 1 receives light emission information via the communication device 153. Then, the control device 15 controls the light emitting device 13 such that the light emitting device 13 emits light in the light emission mode indicated by the light emission information (Step S110). Thereafter, the control device 15 causes the process flow to proceed to Step S115.

In Step S345, the processing device 302 of the server 300 reads the time table 400 (Step S345). Then, the processing device 302 acquires a current time with reference to the timer 307 (Step S350).

Subsequently, the processing device 302 determines whether the current time is in a time period within the predetermined time PT2 (FIG. 4) from the start time of the nearest reserved period (Step S355). When the current time is not in the time period within the predetermined time PT2 from the start time of the nearest reserved period (that is, not a time immediately before the start time) (NO in Step S355), the processing device 302 causes the process flow to proceed to Step S365. On the other hand, when the current time is in the time period within the predetermined time PT2 from the start time of the nearest reserved period (that is, a time immediately before the start time) (YES in Step S355), the processing device 302 sets the position of the charging stand 1 (more specifically, the movable unit 11) such that the charging stand 1 is in the exposed state (Step S360). A position signal S1 indicating the position set in Step S360 is transmitted from the server 300 to the charging stand 1. The position signal S1 is transmitted as a part of the control command CC to the charging stand 1.

In Step S115, the control device 15 of the charging stand 1 determines whether the position signal S1 has been received. When the position signal S1 has not been received (NO in Step S115), the control device 15 repeatedly performs this determination process until the position signal S1 is received. On the other hand, when the position signal S1 has been received (YES in Step S115), the control device 15 controls the lifting device 12 in accordance with the position signal S1 such that the charging stand 1 is in the exposed state (Step S120). Thereafter, the charging connector 111 of the charging stand 1 is taken out from the housing space 115 and is inserted into the inlet 91 of the vehicle 9 by the user.

Subsequently, the control device 15 determines whether the charging start button 17A has been operated by to user (Step S125). Specifically, the control device 15 determines whether a signal indicating that the charging start button 17A has been operated has been received.

When the charging start button 17A has not been operated (NO in Step S125), the control device 15 returns the process flow. On the other hand, when the charging start button 17A has been operated (YES in Step S125), the control device 15 starts plug-in charging of the vehicle 9 (Step S130) and transmits a charging start notification to the server 300 via the communication device 153 (Step S135). Thereafter, the process flow for the charging stand 1 proceeds to Step S150 in FIG. 8 (which will be described later).

In Step S365, the processing device 302 of the server 300 determines whether the charging start notification has been received via the communication device 306. When the charging start notification has not been received (NO in Step S365), the processing device 302 returns the process flow. On the other hand, when the charging start notification has been received (YES in Step S365), the processing device 302 causes the process flow to proceed to Step S368 in FIG. 9 (which will be described later).

In the example illustrated in FIG. 6, a reservation operation of a charging stand is performed using the user terminal 200, but may be performed using the HMI device 98 of the vehicle 9. In this case, in the processes of Steps S205 to S225, the processes performed by the processing device 202, the HMI device 204, and the communication device 206 of the processing device 202 of the user terminal 200 are performed by the ECU 100, the HMI device 98, and the communication device 120 of the vehicle 9.

FIG. 7 is a flowchart illustrating details of a light emission mode setting process (the process of Step S335 in FIG. 6). The following description will be made with appropriate reference to FIG. 4.

Referring to FIG. 7, the processing device 302 reads the time table 400 (Step S3351). The time table 400 is an updated time table when the process of Step S330 (the process of updating the time table 400) has been performed.

In Step S3352, the processing device 302 acquires a current time with reference to the timer 307.

Subsequently, the processing device 302 determines whether the charging stand 1 is reserved based on the reservation state information RI included in the time table 400 (Step S3353). Specifically, the processing device 302 determines whether a reserved period (at least one of the reserved periods RP1, RP2, and RP3 in the example illustrated in FIG. 4) is included in a period after the current time. When the charging stand 1 is not reserved (NO in Step S3353), the processing device 302 causes the process flow to proceed to Step S3355. On the other hand, when the charging stand 1 is reserved (YES in Step S3353), the processing device 302 causes the process flow to proceed to Step S3354.

Subsequently, the processing device 302 determines whether the current time is earlier than the first reference time of the nearest reserved period (Step S3354). The first reference time is a time (time t1, time t6, or time t9 in the example illustrated in FIG. 4) the predetermined time PT1 (for example, 30 minutes) prior to the start time of a next reserved period. When the current time is earlier than the first reference time (YES in Step S3354), the processing device 302 causes the process flow to proceed to Step S3355.

In Step S3355, the processing device 302 determines that the charging stand 1 is available. Then, the processing device 302 sets the emission color of the light emitting device 13 to green based on the determination result (Step S3356). Accordingly, the light emission mode (the emission color in this example) is set. The emission color corresponds to a color indicated by the color state information CI. The light emitting device 13 emits light according to the light emission mode (a state in which the emission color is green in this example) (Step S110 in FIG. 6). As a result, a user can visually recognize that the charging stand 1 is available. After the process of Step S3356, the processing device 302 causes the process flow to proceed to Step S340 in FIG. 6.

On the other hand, when the current time is later than the first reference time (NO in Step S3354), the processing device 302 determines that the current time is in a time period between the start time of the nearest reserved period and the nearest first reference time (Step S3357). Accordingly, the processing device 302 determines that the charging stand 1 is not available (Step S3358). The processing device 302 sets the emission color of the light emitting device 13 to be red based on the determination result (Step S3359). This emission color corresponds to the color indicated by the color state information CI. The light emitting device 13 emits light based on the light emission mode (a state in which the emission color is read in this example) (Step S110 in FIG. 6). As a result, a user can visually recognize that the charging stand 1 is not available. After the process of Step S3359, the processing device 302 causes the process flow to proceed to Step S340 in FIG. 6.

In the processes of the flowchart illustrated in FIG. 7, the processing device 302 may determine whether the charging stand 1 is available based on the availability state information AUI included in the time table 400 instead of performing the processes of Steps S3353 and S3354. Then, the processing device 302 may cause the process flow to branch to Step S3355 or S3358 (S3357) based on the determination result.

FIG. 8 is a flowchart illustrating details of a charging process (Step S20 in FIG. 5).

Referring to FIG. 8, the control device 15 of the charging stand 1 determines whether the SOC of the battery 93 of the vehicle 9 has reached a charging threshold value. Specifically, the control device 15 determines whether a charging stop request CSR has been received from the ECU 100 via the communication device 153. When the SOC has reached the charging threshold value (YES in Step S150), the control device 15 causes the process flow to proceed to Step S160. On the other hand, when the SOC has not reached the charging threshold value (NO in Step S150), the control device 15 causes the process flow to proceed to Step S155.

Subsequently, the control device 15 determines whether the charging stop button 17B has been operated (Step S155). When the charging stop button 17B has not been operated (NO in Step S155), the control device 15 returns the process flow to Step S150. On the other hand, when the charging stop button 17B has been operated (YES in Step S155), the control device 15 causes the process flow to proceed to Step S160.

Subsequently, the control device 15 transmits a charging end notification to the server 300 via the communication device 153 (Step S160). Thereafter, the control device 15 causes the process flow to proceed to Step S170 in FIG. 9.

FIG. 9 is a flowchart illustrating details of a post-charging process (Step S30 in FIG. 5).

Referring to FIG. 9, the processing device 302 of the server 300 determines whether the charging end notification transmitted in Step S160 in FIG. 8 has been received via the communication device 306 (Step S368). When the charging end notification has not been received (NO in Step S368), the processing device 302 repeatedly performs this determination process until the charging end notification is received. On the other hand, when the charging end notification has been received (YES in Step S368), the processing device 302 causes the process flow to proceed to Step S370.

Subsequently, the processing device 302 determines whether the charging connector 111 and the charging cable 112 (FIGS. 2 and 3) are housed in the housing space 115 (Step S370). Specifically, the processing device 302 performs the determination process of Step S370 based on a signal indicating a detection result from a sensor that senses whether the charging connector 111 and the charging cable 112 are housed in the housing space 115.

When the charging connector 111 and the charging cable 112 are not housed in the housing space 115 (NO in Step S370), the processing device 302 repeatedly performs the determination process of Step S370 until the charging connector 111 and the charging cable 112 are housed in the housing space 115. On the other hand, when the charging connector 111 and the charging cable 112 are housed in the housing space 115 (YES in Step S370), the processing device 302 acquires a current time with reference to the timer 307 (Step S375) and causes the process flow to proceed to Step S380.

Subsequently, the processing device 302 determines whether the current time is in a time period between a start time of a next reserved period and the second reference time (Step S380). The second reference time is a time the predetermined time PT2 (for example, 1 minute) prior to the start time of the next reserved period.

When the current time is not in the time period between the start time of the next reserved period and the second reference time (NO in Step S380), the processing device 302 sets the position of the charging stand 1 (more specifically the movable unit 11) such that the charging stand 1 is in the housed state (Step S385). This case corresponds to a case in which the current time immediately after the plug-in charging has ended is not a time immediately before the start time of the next reserved period. A position signal S2 indicating the position set in Step S385 is transmitted from the server 300 to the charging stand 1. The position signal S2 is transmitted as a part of the control command CC to the charging stand 1.

On the other hand, when the current time is in the time period between the start time of the next reserved period and the second reference time (YES in Step S380), the processing device 302 returns the process flow to Step S360 in FIG. 6. This case corresponds to a case in which the current time immediately after the plug-in charging has ended is a time immediately before the start time of the next reserved period. Accordingly, the charging stand 1 is kept in the exposed state such that plug-in charging is possible in the next reserved period. This case corresponds to a case in which the current time is in the time period from time t11 to time t12 in the example illustrated in FIG. 4.

In Step S170, the control device 15 of the charging stand 1 determines whether the position signal S2 has been received via the communication device 153. When the position signal S2 has not been received (NO in Step S170), the control device 15 repeatedly performs this determination process until the position signal S2 is received. On the other hand, when the position signal S2 has been received (YES in Step S170), the control device 15 controls the lifting device 12 based on the position signal S2 such that the charging stand 1 is in the housed state. Specifically, the control device 15 performs lowering control. Thereafter, the control device 15 ends the process flow of FIG. 9.

Modified Example 1 of Embodiment

In the aforementioned embodiment, the processing device 302 sets (changes) the emission color of the light emitting device 13 based on whether the charging stand 1 is available.

On the other hand, the processing device 302 may set the light emission pattern of the light emitting device 13 based on whether the charging stand 1 is available. For example, the processing device 302 may generate the control command CC such that the light emitting device 13 is turned on in the first light emission mode and the light emitting device 13 is turned off in the second light emission mode.

With this configuration, when the charging stand 1 is not available, the light emitting device 13 is turned off and thus electric power of the light emitting device 13 is not consumed. As a result, it is possible to reduce power consumption in the light emitting device 13 and to enable a user to easily recognize whether the charging stand 1 is available.

FIG. 10 is a flowchart illustrating details of the process of setting the light emission mode of the light emitting device 13 according to this modified example. This flowchart is different from the flowchart illustrated in FIG. 7, in that Steps S3356 and S3358 in the flowchart of FIG. 7 are replaced with Steps S3356A and S3358A.

Referring to FIG. 7, when it is determined that the charging stand 1 is available (when Step S3355 is performed), the processing device 302 sets the light emission mode such that the light emitting device 13 is turned on (Step S3356A). On the other hand, when it is determined that the charging stand 1 is not available (when Step S3358 is performed), the processing device 302 sets the light emission mode such that the light emitting device 13 is turned off (Step S3359A).

Modified Example 2 of Embodiment

In the aforementioned embodiment and Modified Example 1, the processing device 302 of the server 300 sets the light emission mode of the light emitting device 13. On the other hand, the control device 15 of the charging stand 1 may set the light emission mode of the light emitting device 13.

For example, the processing device 302 of the server 300 transmits a copy of the time table 400 stored in the storage device 304 to the charging stand 1 via the communication device 306 in real time.

The control device 15 receives the copy via the communication device 153. Then, the control device 15 determines whether the charging stand 1 is available at a current time based on the availability state information AUI included in the copy and the current time indicated by the timer 154. The control device 15 sets the light emission mode of the light emitting device 13 based on the determination result. Specifically, the control device 15 performs the processes of Steps S3351 to S3359 in FIG. 7 (or Steps S3351 to S3355, S3356A, S3357, S3358, and S3359A in FIG. 10). Accordingly, the light emission mode (for example, the emission color or a light emission pattern) is set. The control device 15 controls the light emitting device 13 such that the light emitting device 13 emits light according to the set light emission mode.

Other Modified Examples

The movable unit 11 may be configured to be manually raised or lowered by a user. In this case, a handle which is grasped by a user is provided at the upper end UL of the movable unit 11 (FIGS. 2 and 3).

The "power supply facility" according to the present disclosure is not limited to a charging stand 1 and may be a power supply facility which is used for usage other than plug-in charging of a vehicle 9.

It should be noted that the embodiment described above is exemplary and is not restrictive in all respects. The scope of the present disclosure is defined by the appended claims, not by the aforementioned description, and is intended to include all modifications within meanings and ranges equivalent to the claims.

What is claimed is:

1. A power supply facility that is configured to be housed underground, comprising:
    a light emitting device configured to emit light to a space above the ground; and
    a control device configured to:
    control the light emitting device, wherein the control device causes a first light emission mode of the light emitting device when the power supply facility is available and a second light emission mode of the light emitting device when the power supply facility is not available, wherein the first light emission mode and the second light emission mode are different from each other;
    switch the power supply facility between a housed state in which the power supply facility is housed underground and an exposed state in which the power supply facility is exposed above ground;
    charge a vehicle when the power supply facility is in the exposed state;
    control the light emitting device in the first light emission mode, when (i) the power supply facility is in the housed state and (ii) the power supply facility is not reserved, or the power supply facility is reserved and a current time is earlier than a reference time, wherein a reference time is a predetermined time prior to a start time of a reserved period of the power supply facility;
    control the light emitting device in the second light emission mode, when (i) the power supply facility is in the housed state and (ii) is reserved, and (iii) the current time is in a time period between the reference time and the start time; and
    control the power supply facility to start moving from the housed state to the exposed state at the reference time.

2. The power supply facility according to claim 1, wherein an emission color of the light emitting device in the first light emission mode is a first color, and
    wherein the emission color of the light emitting device in the second light emission mode is a second color.

3. The power supply facility according to claim 1, wherein the light emitting device is turned on in the first light emission mode, and
    wherein the light emitting device is turned off in the second light emission mode.

4. A server comprising:
    a control device configured to control a light emitting device provided in a power supply facility that is configured to be housed underground; and
    a storage device configured to store reservation state information indicating a reservation state of the power supply facility,
    wherein the light emitting device is configured to emit light to a space above the ground, wherein the control device is further configured to:
    determine whether the power supply facility is available based on the reservation state information;
    set a light emission mode of the light emitting device based on the result of determination, including a first light emission mode of the light emitting device when the power supply facility is available and a second light emission mode of the light emitting device when the power supply facility is not available, wherein the first light emission mode and the second light emission mode are different from each other;
    switch the power supply facility between a housed state in which the power supply facility is housed underground and an exposed state in which the power supply facility is exposed aboveground;
    charge a vehicle when the power supply facility is in the exposed state;
    control the light emitting device in the first light emission mode, when (i) the power supply facility is in the housed state and (ii) the power supply facility is not reserved, or the power supply facility is reserved and a current time is earlier than a reference time, wherein a reference time is a predetermined time prior to a start time of a reserved period of the power supply facility;
    control the light emitting device in the second light emission mode, when (i) the power supply facility is in the housed state and (ii) is reserved, and (iii) the current time is in a time period between the reference time and the start time; and
    control the power supply facility to start moving from the housed state to the exposed state at the reference time.

5. The power supply facility according to claim 1, further comprising a lift mechanism configured to raise the power supply facility from the housed state to the exposed state and lower the power supply facility from the exposed state to the housed state.

6. The power supply facility according to claim 1, further comprising a charging start button and a communication device configured to communicate with a remote server, wherein the communication device transmits a charging start notification to the remote server when the charging start button is operated.

7. The power supply facility according to claim 1, further comprising a charging connector that is stored within a housing space when the power supply facility is in the housed state, and
    the charging connector is configured to be removable from the housing space when the power supply facility is in the exposed state.

8. The power supply facility according to claim 1, wherein the light emitting device moves upward when the power supply facility is transitioning from the housed state to the exposed state, and downward when the power supply facility is transitioning from the exposed state to the housed state.

* * * * *